United States Patent Office 3,051,234
Patented Aug. 28, 1962

3,051,234
OIL DISPLACEMENT BY WATER CONTAINING SUSPENDED CLAY
John R. Kyte, Tulsa, Okla., assignor to Jersey Production Research Company, a corporation of Delaware
No Drawing. Filed Jan. 22, 1959, Ser. No. 788,257
7 Claims. (Cl. 166—9)

The present invention is broadly concerned with recovery of oil from subterranean oil resorvoirs. More particularly, the invention concerns an improved flooding procedure in which thickened water is employed to displace oil from such reservoirs. The invention especially relates to a method of water-flooding in which the effective viscosity of the flood water is increased by the addition of suspended clay.

It is a well known practice in petroleum industry, when an underground oil reservoir lacks sufficient natural oil-driving means to maintain an economical oil production rate, to inject an oil-displacing fluid into the reservoir. Thus, it is a wide-spread practice to inject gas or water within a reservoir through one or more injection wells so as to displace oil from the reservoir through one or more production wells. These methods are generally referred to as methods of secondary recovery, and the particular technique of injecting water is generally described as waterflooding.

While conventional waterflooding is effective in obtaining additional oil from subterranean oil reservoirs, it has a number of shortcomings which detract from its value. Foremost among these is the tendency of flood water to finger through a reservoir and to by-pass substantial portions thereof. In other words, a waterflood or water drive usually has a less than perfect "sweep" efficiency in that the water does not contact all portions of a reservoir. Furthermore, much of the recoverable oil is not normally displaced from the portions of a reservoir that are contacted by the water.

The fingering tendency of a waterflood is usually explained by the fact that oil reservoirs possess regions or strata that have different permeabilities. Some of these regions and strata have a greater relative permeability to water than do other portions of a reservoir, with the result that flood water flows more readily through these regions and strata. This causes an inefficient displacement of the oil by the water.

Petroleum crude oils vary greatly in viscosity—some being as low as 1 or 2 centipoises and some ranging up to 1,000 centipoises (cps.) or even more. This information is of interest, since waterflooding is less satisfactory with viscous crude oils than with relatively non-viscous oils. In other words, the fingering and by-passing tendencies of flood water are more or less directly related to the ratio of the viscosity of the crude oil within a reservoir to the viscosity of the aqueous driving fluid.

Also of interest is a mathematical relationship that has been developed to help explain the behavior of fluids flowing through porous media such as oil reservoirs. This relationship shows that oil is displaced more efficiently by water when the water to oil viscosity ratio is increased.

Thus, the water to oil viscosity ratio affords a measure of the volume of flood water required for a waterflood to reduce the oil content of a reservoir to a particular value. For example, a given volume of flood water operating at a water to oil viscosity ratio of one will displace a markedly greater volume of oil from a reservoir than will an equal volume of water operating at a water to oil viscosity ratio of substantially less than one.

It is accordingly, a general object of this invention to increase the viscosity of flood water within an oil reservoir by the addition of a thickening agent which is economical, chemically stable, and readily available.

These and related objects of the invention, which will be expressly discussed or readily apparent from the following description, may be attained by incorporating a suspension of clay within the water used in a waterflooding operation. More specifically, a clay, having a fineness sufficient to pass through a given reservoir, is suspended within the flood water, and the water is thereafter injected through one or more injection wells into the reservoir. Oil displaced from the reservoir by the injected water is recovered through one or more production points or wells spaced from the injection wells.

In adding clay to a body of flood water, it may be added to the entire body of water; or, alternatively, it may be added to merely a portion of the body of water. In the latter event, however, the clay should be added to the water forming the forward portion of a flood. In this way, the viscosity-increasing effects of the clay may be more fully exploited.

When clay is added only to the leading portion of a waterflood, the portion of water so thickened should preferably be sufficient in volume to prevent the trailing, relatively non-viscous water from breaking through the viscous water and contacting reservoir oil ahead of the thickened water.

The minimum quantity of thickened water to be used in any given reservoir will depend upon such well-recognized factors as the flooding pattern, the distance between wells, the viscosity of the crude oil, etc. In some reservoirs, it is contemplated that the volume of water containing clay need not exceed about 10 percent of the reservoir pore volume under flood. In most reservoirs, however, it is contemplated that the volume of thickened water should be at least 20 percent of the pore volume.

At this point it is well to note that it is conventional in the petroleum industry to carry out waterflooding operations using certain regular flooding patterns. Thus, the volume of a reservoir under flood at any one time may be considered to be the volume of the reservoir underlying the lateral area defined by the patterns under flood at such time.

Expressed otherwise, it is general practice in the petroleum industry—especially in large reservoirs or fields—to flood using one or more flooding "patterns." It may therefore be convenient, in applying a bank-type version of the present invention, to consider the individual patterns within a reservoir in determining the quantities of thickened water to employ. To illustrate, in "line drive floods" it may be assumed that the pore volume of a reservoir under flood between each row of injection wells and an adjacent row of producing wells is the total pore volume of the reservoir underlying the lateral area between the two rows. The quantity of clay-thickened water injected within the row of injection wells toward the row of producing wells should therefore generally be at least about 10 percent of the total reservoir volume between the two rows, and in most cases should be greater than 20 percent.

In determining the quantity of clay to be suspended within the flood water in any given waterflooding operation, the quantity should be sufficient so as to increase the viscosity of the water to a substantial extent. Preferably, the quantity should be sufficient—wherever possible—to endow the flood water with a mobility within the reservoir substantially equal to or less than the mobility of the reservoir oil.

As a practical matter, the method of this invention has application essentially to those reservoirs in which the reservoir oil has a viscosity of at least about 5 centipoises. When practicing the invention in such reservoirs, then, the clay-thickened water would normally have a viscosity of at least about 5 centipoises—and preferably at least enough to endow the thickened water with a mobility about equal to that of the reservoir oil.

The clay used to thicken the water in any given instance should be sufficiently fine to pass through the reservoir. Thus, in preparing a clay-thickened flood water it is generally desirable and necessary to settle, centrifuge, filter, or otherwise treat the thickened water so as to remove objectionably large clay particles. The suitableness of a thickened water, in this connection, may be determined experimentally by passing portions or test samples of the water through core samples of the reservoir. Thus, if the flow rate (for a given input pressure) of thickened water flowing through such a core sample decreases markedly with time, it will be quite apparent that the size of some clay particles within the water is too great.

In general, it will be very difficult to remove all of the clay particles within a clay-thickened flood water which exceed the size required to pass through a reservoir. It has been observed, however, that such particles—when passed into a reservoir rock—are removed from the flood water substantially on contact with the rock. It has further been observed that these particles can then be removed from the face of the rock quite readily by back-flowing for a relatively short period of time. Thus, within an actual reservoir, clay-thickened water may be injected through an injection well into the reservoir until the injection rate falls off to a certain preselected level (or until the injection pressure rises to a preselected level). At this point the injection well or wells may be back-flowed for a short period of time so as to dislodge any large particles of clay trapped on the face of the reservoir rock within the well or wells. After removing these large particles from the well—as by circulating them to the earth's surface—water injection may be resumed.

In selecting a clay for use in practicing the invention, any clay of suitable fineness and water thickening ability may in general be employed. In this connection, however, it has been observed that montmorillonite-containing clays such as bentonite are suitable. These clays are extremely fine, and they swell markedly in water. The viscosity of clay-thickened water, incidentally, may vary somewhat depending upon its temperature. Accordingly, its viscosity as used in this description, is intended to mean its viscosity under reservoir conditions.

The viscosity of the oil within a given reservoir and the relative mobilities of the oil and the driving water within the reservoir may be determined as necessary according to conventional procedures. For example, the viscosity of the oil may be found by performing measurements on an actual sample of the oil. It may also be determined by reconstituting a sample of the oil and thereafter measuring its viscosity.

The relative permeabilities of reservoir rock to oil and to flood water (thickened or otherwise) likewise may be obtained by making measurements in a conventional manner upon core samples derived from the reservoir.

In practicing the invention in any particular reservoir, essentially conventional techniques may be used in preparing the reservoir. Thus, the reservoir may be divided into patterns of one or more types; and one or more of the patterns may be put under flood at different stages in the flood. Additional wells may be drilled as necessary to complete the various patterns; and these wells may be completed for injection or production service, as the case may be.

For any specific flooding pattern within a reservoir, clay-thickened water may be injected through one or more input wells into the reservoir toward the output wells. Conventional techniques may be used to incorporate and suspend a clay within the water; and the suspension may be tested and treated for objectionably large particles as described earlier. The individual input wells may also be back-flowed from time to time as necessary to remove any large particles of clay which may tend to reduce the injectivity rates of these wells.

Fluids produced by the output wells may be handled according to conventional techniques. When thickened water reaches the output well, however, it may be desirable in some cases to separate such water from the produced oil for recycling or re-injection within the reservoir.

In addition to increasing the viscosity of water, a clay suspension also tends to make the rock within a reservoir more water-wet. Tests have indicated the mechanism accounting for this tendency is not fully understood, but the tendency is advantageous in that it promotes or increases flooding efficiency.

The invention may be better understood by reference to the following example in which water thickened by suspended clay was passed through a core sample of Bigheart sandstone. This particular sandstone has a porosity of about 20 to 25 percent and a permeability of about 1,000 millidarcies (mds.) to water. The sample, in this instance was 2.54 cm. in diameter and about 4.5 cm. long. The core was mounted within a tube so that fluid could be pumped through it.

An aqueous clay suspension to be pumped through the above core was prepared by making a 6 percent slurry of bentonite in tap water using a Waring Blendor. One liter of this slurry was centrifuged for about 15 minutes at 2500 r.p.m. on a 16-inch long arm. The supernatant liquid was decanted from the centrifuged solid material, and it was permitted to stand for about 4 days. No additional solid material was observed to settle out during this period.

In making the flow tests upon the core sample, tap water was first flowed through the core in order to ascertain and check the permeability of the core toward water. In this portion of the testing program, two 100 milliliter (ml.) portions of tap water were pumped through the core with a pressure drop of about 42 p.s.i. In two separate tests, intervals of 30 and 30.5 seconds were required for the throughput of 100 ml. portions. No loss in the permeability of the core toward water was observed.

In the next step of the testing program, three 100 ml. portions of the clay suspension were pumped through the core in succession—again with a 42 p.s.i. pressure drop. The clay suspension in each instance had an apparent viscosity of about 8.2 cps. The successive 100 milliliter portions of the suspension required 246.5 seconds, 264.8 seconds, and 303.0 seconds, respectively, to flow through the core. A small but progressive amount of plugging was therefore indicated.

Following the second series of tests, tap water was again pumped through the core in two 100-milliliter portions and at the same pressure drop as before. In this instance intervals of 59.0 and 60.4 seconds, respectively, were required—indicating a loss in permeability of the core toward water of about 50 percent.

To ascertain whether the apparent plugging caused by the clay suspension in the second series of tests was permanent, three 100-milliliter portions of tap water were next pumped through the core in a direction opposite to the previous flows of tap water and clay suspension. Successive time intervals of 33, 30, and 29 seconds were required in these tests, indicating that any plugged condition of the core was quickly and entirely relieved by the back-flowing technique.

In addition to the above flood test program, the clay suspension used in the second set of tests was studied for possible changes in its viscosity after it had flowed through the core. In making this study, a portion of the original centrifuged and settled slurry was compared in an Ostwald viscometer with a portion of the slurry passed through the core. In each instance the suspension was placed in the viscometer and was made to move rapidly back and forth and several times through the viscometer before timing its flow. The results from the viscometer differed by only 1 second in almost 50 seconds, indicating substantially no loss in viscosity for the clay suspension in flowing through the core.

The invention claimed is:

1. In a waterflooding process for recovering oil from a subterranean oil reservoir, the improvement which comprises suspending clay within at least a portion of the waterflood in a quantity sufficient to substantially increase the viscosity of said portion, said clay having a fineness sufficient to pass through said reservoir.

2. A process as defined in claim 1 in which said portion has a viscosity of at least 5 centipoises.

3. A process as defined in claim 1 in which the quantity of thickened water is at least about 10 percent of the reservoir pore volume under flood.

4. A method of producing oil from a reservoir by means of a pattern including an input well and a spaced output well, which comprises: injecting water containing suspended clay into the reservoir through the input well, said clay having a fineness sufficient to pass through said reservoir, the amount of clay within the injected water being sufficient to increase the viscosity of the water to a value of at least about 5 centipoises, the quantity of such water being at least 10 percent of the pore volume of the reservoir within the pattern, and recovering fluids through said output well.

5. In a waterflooding process for recovering oil from a subterranean oil-bearing formation, the improvement which comprises increasing the viscosity of the flood water to a value of at least five centipoises by suspending clay in a sufficient quantity within the flood water, said clay having a fineness sufficient to pass through the reservoir.

6. A process as defined in claim 1 in which the clay is of a montmorillonite type.

7. A process as defined in claim 1 in which the clay is of a bentonite type.

References Cited in the file of this patent

UNITED STATES PATENTS

| | | |
|---|---|---|
| 2,044,758 | Cross et al. | June 16, 1936 |
| 2,771,138 | Beeson | Nov. 20, 1956 |